Dec. 23, 1969  W. J. SCHRENK ET AL  3,485,912
COMPOSITE ARTICLE FORMATION
Filed Feb. 9, 1965  2 Sheets-Sheet 1
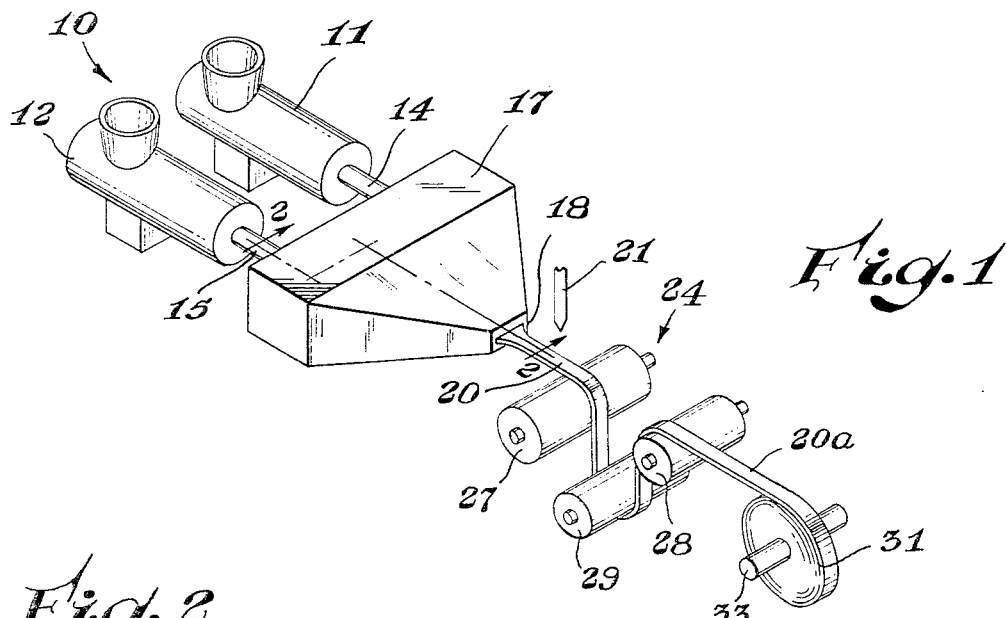
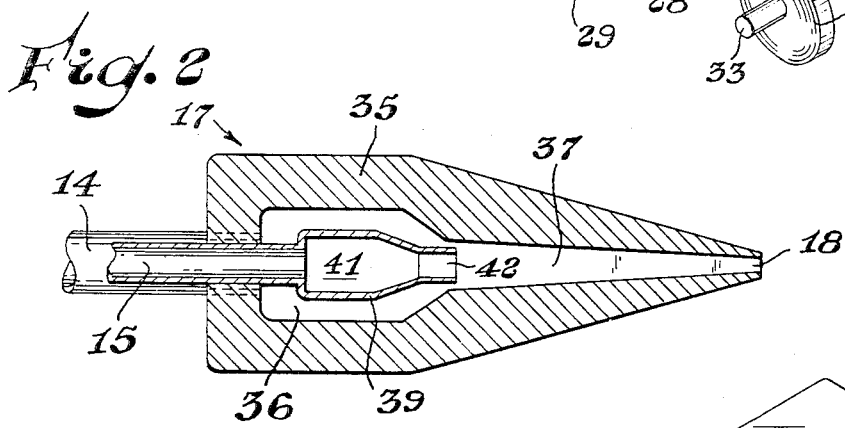
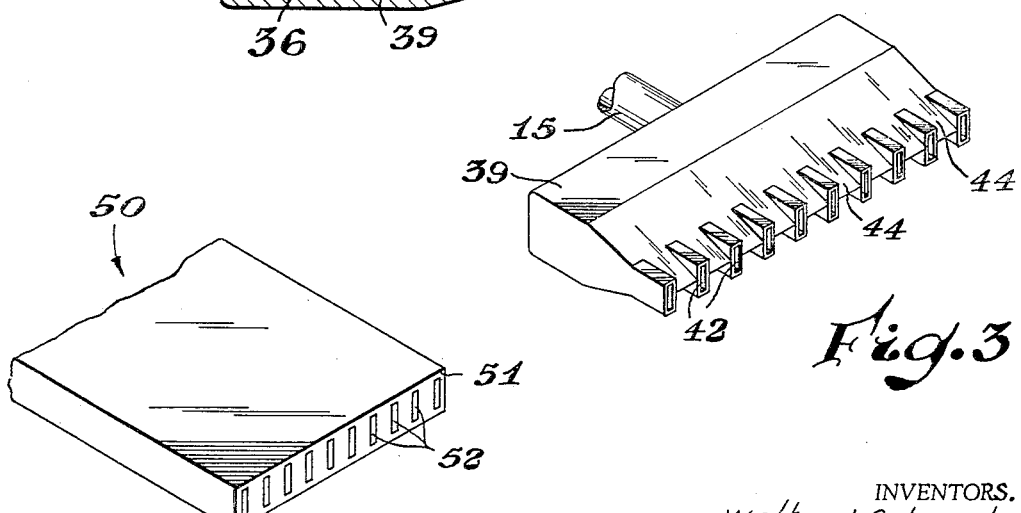
INVENTORS.
Walter J. Schrenk
Douglas S. Chisholm Dec. 23, 1969 W. J. SCHRENK ET AL 3,485,912
COMPOSITE ARTICLE FORMATION
Filed Feb. 9, 1965 2 Sheets-Sheet 2
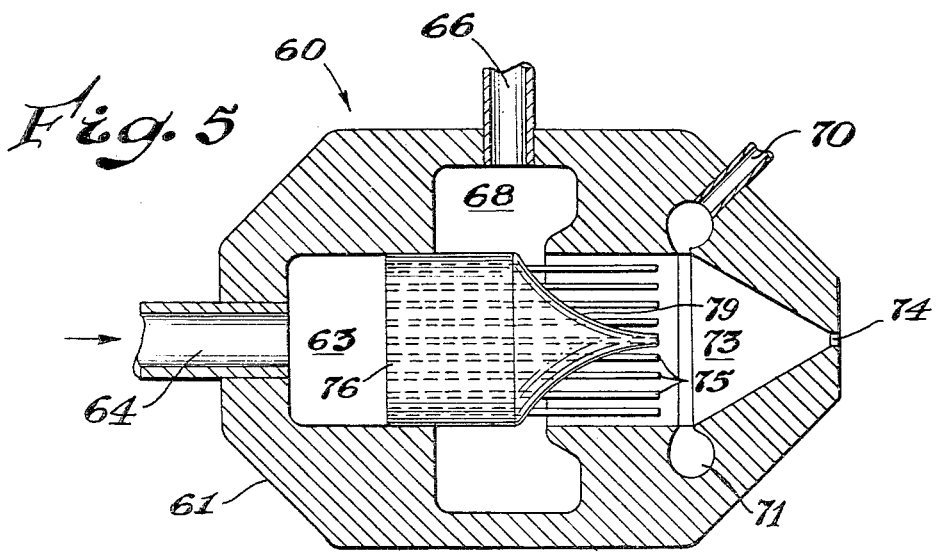
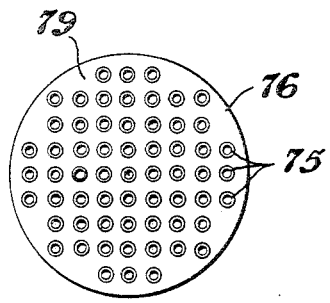
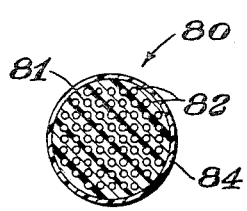
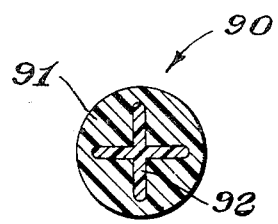
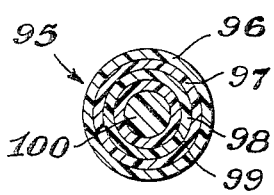
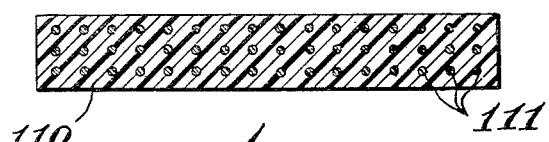
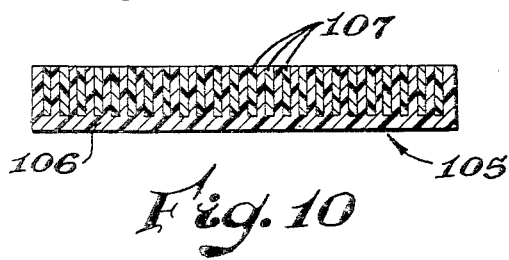
INVENTORS.
Walter J. Schrenk
Douglas S. Chisholm
BY
AGENT
ATTORNEY United States Patent Office 3,485,912
Patented Dec. 23, 1969

3,485,912
COMPOSITE ARTICLE FORMATION
Walter J. Schrenk, Bay City, and Douglas S. Chisholm, Midland, Mich., assignors to The Dow Chemical Company, Midland, Mich., a corporation of Delaware
Filed Feb. 9, 1965, Ser. No. 431,339
Int. Cl. D01d 5/28; B29f 3/10
U.S. Cl. 264—171                 3 Claims

ABSTRACT OF THE DISCLOSURE

Plastic strapping and similar high strength material is prepared by the simultaneous extrusion of a high modulus material within a low modulus material and the extrude stretched to orient the high modulus material to provide a strong nonfibrillating product.

---

This invention relates to composite articles and a method for the preparation thereof. It more particularly relates to synthetic resinous elongated articles of high tensile strength comprising at least a two-phase simultaneous extrusion of resinous materials of diverse characteristics and the method for the production of such articles.

High tensile strength elements such as tapes, filaments, cordage and the like are known which are prepared by initially manufacturing a plurality of synthetic resinous oriented strands or filaments and subsequently encapsulating such materials within a relatively soft low tensile strength matrix or casing. Oftentimes such composite articles are employed as strapping for packing and find particular advantage in that the ends thereof are readily joined together by means of heat sealing, adhesives and the like. The manufacture of such articles usually requires a minimum of at least two separate operations, that is, the preparation of the reinforcing oriented material and the subsequent encapsulation thereof.

It is an object of this invention to provide an improved method for the preparation of monodirectionally oriented thermoplastic resinous bodies encapsulated within synthetic resinous materials.

A further object of this invention is to provide a method for the preparation of strandular composite plastic articles comprising two separate resinous phases.

Another object of this invention is to provide a method for the production of such articles wherein a generally direct transition from resinous particles to a composite article is achieved.

A further object of the invention is to provide oriented thermoplastic resinous bodies embedded within a matrix of a resinous material which is readily separable therefrom.

Articles in accordance with the present invention comprise a plurality of elongated bodies of an oriented thermoplastic resinous material, each of the elongated bodies contained within a common thermoplastic resinous matrix.

The method of the present invention comprises providing at least a first stream of a synthetic thermoplastic resinous material in a heat plastified condition, the first stream of material, on cooling, being capable of orientation to provide a high tensile strength mono-directionally oriented body, at least a second stream of a synthetic thermoplastic resinous material which, on cooling, has an elongation at break substantially greater than the elongation at break of the oriented thermoplastic material, causing the first stream of thermoplastic resinous material to flow within the second stream of thermoplastic material to form a composite stream, shaping the composite stream to a desired configuration, cooling the composite stream to a temperature at which the material of the first stream will orient and subsequently drawing the composite stream to a degree sufficient to provide monodirectional orientation within the material of the first stream to provide a composite article.

The method of the invention is particularly adapted to be practiced employing apparatus which comprises in cooperative combination a first thermoplastic material supply means, a second thermoplastic material supply means, a die, the die comprising a die body which defines a first internal passageway and a second internal passageway, the first internal passageway terminating in an extrusion orifice, the second internal passageway terminating within the first passageway in a plurality of extrusion orifices, the first passageway in operative communication with the first supply means and adapted to receive a heat plastified thermoplastic resinous material therefrom, the second passageway being in operative communication with the second supply means and adapted to receive a thermoplastic resinous material therefrom, an extrude withdrawal means positioned generally adjacent the extrusion orifice of the first passageway and adapted to receive and remove the extrude at a linear rate greater than the linear rate of extrusion from the orifice.

Further features and advantages of the present invention will become more apparent from the specification when taken in connection with the drawing wherein:

FIGURE 1 is a simplified schematic illustration of apparatus for practice of the method of the invention;

FIGURE 2 is a sectional view of the die employed in the apparatus of FIGURE 1;

FIGURE 3 is a depiction of an isometric view of the portion of the die of FIGURE 1;

FIGURE 4 is a representation of a produce employed utilizing the apparatus of FIGURES 1, 2 and 3;

FIGURE 5 is an alternate configuration of a die suitable for the practice of the invention;

FIGURE 6 depicts a view of a component of the die of FIGURE 5;

FIGURE 7 depicts a composite article prepared utilizing the die of FIGURE 5;

FIGURES 8, 9, 10 and 11 depict some of the configurations of articles prepared in accordance with the present invention.

In FIGURE 1 there is illustrated an apparatus suited for the practice of the method of the invention generally designated by the reference numeral 10. The apparatus 10 comprises in cooperative combination a first extruder 11 and a second extruder 12. The extruders 11 and 12 are adapted to deliver first and second streams of heat plastified thermoplastic resinous material. The extruder 11 terminates in a conduit 14. The extruder 12 terminates in a conduit 15. The conduits 14 and 15 are in operative communication with the die 17. The die 17 has an extrusion orifice 18 from which issues a composite stream 20 of thermoplastic resinous material. Disposed generally adjacent the orifice 18 is a cooling means 21 adapted to reduce the temperature of the stream 20 to an orientation temperature. Also generally adjacent the orifice 18 is an orientation means 24 adapted to stretch or orient the stream or ribbon 20. The apparatus 24 comprises in cooperative combination rolls 27, 28, and 29, as driven by means not shown at successively increasing surface speeds. A composite thermoplastic article 20a issues from the orienting apparatus 24 and is wound onto a roll 31 by the takeup or winding means 33.

In FIGURE 2 there is depicted a sectional view of the die 17 taken along the line 2—2 of FIGURE 1. The die 17 comprises in cooperative combination a first or outer housing 35, the housing 35 defines an internal or first passageway 36 which is in operative communication with the conduit 14 of the extruder 11 and adapted to receive heat plastified thermoplastic material therefrom. Remote from the conduit 14 the die outer housing 35 defines a converging passageway 37 adapted to provide substantially streamline flow therein and the passageway 37 is in communication with the first passageway 36 and terminates in the extrusion orifice 18 positioned remotely from the conduit 14. A second or inner housing 39 is positioned within the first passageway 36, the second housing 39 defines a second passageway 41. The second passageway 41 is in communication with the conduit 15 from the second extruder 12 and is adapted to receive heat plastified thermoplastic material therefrom. The second or inner housing 39 defines a plurality of extrusion orifices 42 disposed within the first or outer housing 35 and adapted to deliver a plurality of streams of thermoplastic resinous material within a stream of thermoplastic resinous material passing through the passageway 36 into the constricted or reducing passageway 37.

In FIGURE 3 there is illustrated a schematic isometric representation of the housing 39 of the die 17 of FIGURE 2 illustrating the general relationship between the conduit 15 and the extrusion orifice 42. The housing 39 defines a plurality of channels or passageways 44 disposed between the adjacent portions of the housing forming the adjacent extrusion orifices 42.

In FIGURE 4 there is illustrated a composite thermoplastic resinous article generally designated by the reference numeral 50 prepared by the apparatus of FIGURES 1, 2 and 3. The article 50 comprises a thermoplastic resinous matrix 51 having encapsulated therein a plurality of elongated oriented thermoplastic resinous elements 52, each of the elements 52 being surrounded on all sides by the matrix 51 and are separated from each other thereby.

In FIGURE 5 there is illustrated a schematic sectional representation of an alternate die for use in the practice of the method of the present invention generally designated by the reference numeral 60. The die 60 comprises a housing 61, the housing 61 defines a generally cylindrical inner cavity 63, a first thermoplastic resinous material passage 64 in full communication with the cavity 63, a second thermoplastic resin passageway 66, a first annular passageway 68, a third thermoplastic resinous passageway 70 which is in communication with a generally annular internal passageway 71, the passageway 71 being remotely disposed from the cavity 63 and the passageway 68 being disposed intermediate to the cavity 63 and the passageway 71, a second cavity 73 having a generally frustoconical configuration in communication with the first annular cavity 68 and the second annular cavity 71, the cavity 73 terminating remote from the cavities 68 and 71 in an extrusion orifice 74 having a substantially smaller cross sectional dimension than the dimension of the cavity 73 adjacent the annular passageways 68 and 71, a distributor means 76 disposed within the cavity 63, the distributor means 76 defining a plurality of passageways 75, the distributor 76 being in sealing engagement with the housing 61, effectively preventing a flow from the cavity 63 to the cavity 73 except by means of the passageways 75. Generally adjacent the passageways 75 providing communication between the cavity 63 and the cavity 73, each of the passageways 75 terminating remote from a generally conical surface 79 of the distribution means 76, the generally conical surface 79 of the distributor 76 being disposed adjacent the annular passageways 68 of the housing 61.

In FIGURE 6 there is illustrated a view of the distributor 76 illustrating the relationship between the conical face 79 and the various passageways 75 disposed within the distributor 76.

In FIGURE 7 there is illustrated a cross sectional view of a filament or strandular article prepared utilizing a die in accordance with FIGURES 5 and 6. The filament is generally designated by the reference numeral 80. The filament 80 comprises a thermoplastic resinous matrix 81 having disposed therein a plurality of monodirectionally oriented synthetic resinous filaments 82. The matrix 81 is encapsulated by a third thermoplastic resinous material 84.

FIGURE 8 depicts an alternate configuration of a filament 90 comprising a matrix 91 and an oriented elongated body 92. The configuration of FIGURE 8 is obtained when the distributor 76 of FIGURES 5 and 6 is replaced by a distributor having a cross shaped aperture therein.

In FIGURE 9 there is illustrated a sectional view of an alternate configuration of body designated by the reference numeral 95 which comprises a plurality of generally concentric layers 96, 97, 98 and 99 surrounding a central core 100. Beneficially, alternate components such as the core 100, layers 98 and 96 comprise monodirectionally oriented thermoplastic material. The configuration of the article illustrated in FIGURE 9 is readily obtained by utilizing a die generally similar to that of FIGURE 5 wherein the distribution means is removed and three annular passageways are employed.

FIGURE 10 is a cross sectional representation of a tape generally designated by the reference numeral 105. The tape 105 comprises a thermoplastic resinous matrix 106 which has a plurality of monodirectionally oriented thermoplastic resinous filaments or tapes, partially encapsulated tapes 107 contained therein, wherein one side of the tapes 107 are substantially coextensive with one surface of the tape 105.

In FIGURE 11 there is illustrated a sectional view of a tape-like article comprising a thermoplastic resinous matrix 110 having a plurality of oriented thermoplastic resinous filaments 111 encapsulated therein. Each of the filaments 111 is separated from its adjacent neighbors by the matrix 110.

The method of the present invention is readily understood by reference to FIGURES 1, 2 and 3. In FIGURE 1 there is shown a first extruder 11 which provides a stream of a heat plastified thermoplastic resinous material of relatively high elongation (at normal temperatures of use) through conduit 14 to the internal passageway 36. The material from the extruder 11 then passes to the constricting or reducing portion 37 and is discharged from the extrusion orifice 18. Simultaneously with the passage of the material from the extruder 11 material from the extruder 12 passes through the conduit 15 and into the passageway 41 of the housing 39 and subsequently is discharged from the extrusion orifices 42, as a plurality of separate and individual streams of material from the extruder 11 flow in the channels 44 of the housing 39 and separates the streams issuing from the orifices 42. As the composite stream of material from the extruders 11 and 12 is formed adjacent the orifices 42 which flows in a streamlined manner through the passage 37 and is significantly reduced in cross section until it reaches the extrusion orifice 18. The material issuing from the extrusion orifice 18 has a cross sectional configuration generally approaching that of the composite stream first formed adjacent the orifices 42. The resultant composite stream of extrude is cooled if necessary by a cooling apparatus such as the cooling means 21 to a temperature at which the orientable component of the stream or ribbon such as the ribbon 20 may be monodirectionally oriented. The ribbon is then passed to an orienting means such as the orienting means 24 of FIGURE 1 wherein said rolls operating at successively higher linear surface speeds draw or extend the composite ribbon 20, causing orientation of the orientable component thereof to result in the ribbon 20a which is subsequently wound to a package such as the roll 31. The configuration of ribbon or article such as the article 50 of FIGURE 4 is particularly and beneficially employed where high tensile members are required which are heat sealable and useable as strapping for packing and the like.

The general operation of the die of FIGURE 5, when used in cooperation with the requisite number of extruders, is substantially identical with that of the die 17 of FIGURE 1. Heat plastified thermoplastic resinous orientable component is introduced through the passageway 64 into the cavity 63. From the cavity 63 it is distributed as a plurality of streams into the passageway 73. Thermoplastic resinous material entering into the passageway 66 is distributed into the annular passageway 68 and subsequently flows over the surface 79 of the distributor 76 encapsulating the various streams issuing from the passageways 75. A thermoplastic resinous material entering the passageway 70 is distributed about the annular passageways 71 which serves to encapsulate the material provided through the passageways 64 and 66. The cross sectional area of the stream is reduced in the cavity 73 and issues from the extrusion orifice 74 whereupon it is cooled and oriented to the desired degree.

Filaments or strands such as that illustrated in FIGURE 7 provide a particularly beneficial and advantageous strand which is eminently satisfactory for such applications as insulating guy lines and the like where high tensile stress and maximum weather resistance are required. For example, the matrix beneficially is of polyethylene, the filamentary reinforcing strands are of nylon and the coating 84 is a carbon black containing polyethylene composition particularly adapted to withstand exposure to the weather. In any of the embodiments of the invention the relative proportion of material is readily controlled by adjusting the amount of heat plastified thermopalstic material delivered to the die. Thus, for example, the die arrangement shown in FIGURES 1 and 2 will readily provide a material consisting of from about 95 percent of encapsulated material and about 5 percent of matrix material, or from over 99 percent matrix material and about 1 percent encapsulated material.

The embodiment of FIGURE 8 is particularly adaptable for the extrusion of "odd shaped" sections wherein a desired small section does not have the required physical strength to maintain the desired configuration when rolled. Thus it may be extruded in essentially a package of a low cost polymeric material which is readily separated therefrom at a later desired time.

The embodiment of FIGURE 9 is particularly adaptable for uses as a high tensile element such as guy cable, control cable, or the like where maximum flexibility and strength is desired.

FIGURE 11 is an alternate embodiment which is particularly suitable for applications such as strapping as the embodiment of FIGURE 4, but exhibits a greater degree of flexibility when like quantities of each of the thermoplastic resinous material are utilized.

The embodiment of FIGURE 10 is particularly suited for the preparation of small plastic strips of orientable material. Relatively delicate shapes and forms are prepared by encapsulating the orientable material in such a manner that it is readily released from the matrix by stretching of the matrix.

In the practice of the method of the present invention the matrix material is generally for most purposes chosen from relatively soft materials such as polyethylene, rubber, plasticized polyvinylchloride, ethyl cellulose, and the like, whereas the encapsulated phase or phases are most often chosen from such materials as the various nylons such as Nylon 6, Nylon 66, Nylon 7, Nylon 8, crystalline polyvinylidene chlorides, and the like. The extrusion temperatures and rates are generally in accord with those of the published literature. However, the outermost phase which is required to contact the inner surface of the die is the only phase which must rigidly adhere to normal extrusion conditions. By normal extrusion conditions is meant the conditions of temperature, pressure and flow rate at which a satisfactory article may be obtained when the material is extruded from an extruder alone. The encapsulated phases may depart considerably from their normal operating temperatures and apparently due to the presence of the outer or encapsulating phase are found to provide eminently satisfactory composite articles when the encapsulated phase is extruded above or below the normal operating range at temperatures of course where the material is fluid and can be forced through the various passageways.

In the practice of the present method of the invention, high strength monodirectionally oriented articles are readily fabricated from a wide variety of thermoplastic materials, the critical feature being that for a tape, filament or body of maximum physical resistance the encapsulated phase should be monodirectionally oriented to a maximum degree while the encapsulating phase is maintained with a minimum orientation. Thus, stretching temperatures are selected to favor the orientation of the encapsulated material. In this matter, a relatively high proportion of high strength material is incorporated into a body of non-oriented material which prevents fibrillation, thus an essentially monodirectionally oriented product is obtained of high tensile strength.

By way of further illustration, a plurality of tapes are prepared having a configuration generally as illustrated in FIGURE 11 wherein the filaments within the matrix comprised about 70 percent of the total cross sectional area. The following combinations are found to give high strength tapes resistant to fibrillation and eminently suited as strapping: high density polyethylene encapsulated in low denity polyethylene; Nylon 66 encapsulated in polyethylene; Nylon 66 encapsulated in polyvinylchloride; Nylon 66 encapsulated in a blend of 80 parts of polystyrene and 20 parts of butadiene rubber; Nylon 6 encapsulated in a copolymer of 85 parts vinyl chloride and 15 parts vinyl acetate; polypropylene encapsulated in polyethylene; polypropylene encapsulated in a copolymer of 80 parts polyvinylchloride and 20 parts butyl acrylate; polypropylene encapsulated in a blend of 80 parts of polystyrene and 20 parts by weight of butadiene rubber; polystyrene encapsulated in polyethylene; a copolymer of 90 parts by weight vinylidene chloride and 10 parts by weight vinyl chloride encapsulated in polyethylene; and a copolymer of 90 parts by weight vinylidene chloride and 10 parts by weight vinylchloride encapsulated in a copolymer of 85 parts of vinyl chloride and 15 parts of vinylidene chloride. In each case, the temperature of the extruded stream was maintained at the optimum temperature for the orientation of the encapsulated phase. Tapes of high tensile strength are obtained and they exhibit great resistance to fibrillation, in sharp contrast to an oriented tape of the encapsulated material alone.

Repetition of the foregoing illustrations varying the proportion of the encapsulated materials results in enlargement or reduction of the size of the filaments within a given cross section of the tape until the proportion of the encapsulated material becomes sufficiently high that distortion of the cross sectional configuration of the filaments occurs. Thus, only a relatively small quantity of matrix or encapsulating material is used. The filaments tend to become square as the amount of encapsulating material is further reduced, inequalities in the distribution of the encapsulating material become sufficiently evident to make obvious any deficiencies within the particular die relative to a uniform flow of the encapsulation.

What is claimed is:
1. A method of preparing a composite article having a plurality of spaced apart high strength elements encapsulated within a lower strength matrix, the steps of the method comprising
    extruding a first stream of a synthetic thermoplastic resinous material in a heat plastified condition, the first stream of material on cooling being capable of orientation to provide a high tensile strength monodirectionally oriented body,
    dividing the first stream into a plurality of substreams,
    providing at least a second stream of a synthetic resinous material which, on cooling, has an elongation at break substantially greater than the elongation at break of the oriented thermoplastic resinous material, causing the plurality of substreams within the second stream of the thermoplastic material to form a composite stream having a plurality of spaced apart substreams encapsulated by a matrix formed by the second stream, cooling the composite stream to a temperature at which the material of the substreams will orient and subsequently drawing the composite stream to a degree sufficient to provide monodirectional orientation within the material of the substreams, thereby providing a composite article comprising a matrix having a plurality of spaced apart members of a high tensile material in a matrix of a higher elongation material.

2. The method of claim 1 wherein the first stream of material is divided into a plurality of generally parallel coplanar substreams.

3. The method of claim 1 wherein the first stream is split into a plurality of substreams which form a three dimensional pattern.

References Cited

UNITED STATES PATENTS

| 2,386,173 | 10/1945 | Kulp et al. | |
| 2,627,088 | 2/1953 | Alles et al. | |
| 3,038,235 | 6/1962 | Zimmerman | 264—171 |
| 3,146,284 | 8/1964 | Markwood | 264—210 |
| 3,176,344 | 4/1965 | Opferkuch. | |
| 3,274,646 | 9/1966 | Krystof. | |
| 3,315,021 | 4/1967 | Luzzatto | 264—171 |

ROBERT F. WHITE, Primary Examiner

J. R. THURLOW, Assistant Examiner

U.S. Cl. X.R.

264—174, 177, 210